UNITED STATES PATENT OFFICE.

JAMES M. WRIGHT, OF BLOOMINGTON, INDIANA, ASSIGNOR TO HORACE BLAKELY, OF INDIANAPOLIS, INDIANA, AND JEFFERSON M. WRIGHT, OF BLOOMINGTON, INDIANA.

CHEMICAL ROOFING MATERIAL.

SPECIFICATION forming part of Letters Patent No. 691,882, dated January 28, 1902.

Application filed October 18, 1901. Serial No. 79,165. (No specimens.)

*To all whom it may concern:*

Be it known that I, JAMES M. WRIGHT, a citizen of the United States, residing at Bloomington, in the county of Monroe and State of Indiana, have invented a certain new and useful Chemical Roofing Material, of which the following is a specification.

My composition consists of the following ingredients, combined in the proportions stated, viz: coal-tar, one gallon; slaked lime, two ounces; sal-soda, (sodium carbonate,) one-half ounce; gum-acacia, one-fourth ounce; oxid of zinc, one-fourth ounce; litharge, five ounces; gypsum, (sulfate of lime,) six to eight ounces. Any multiple of these ingredients in the above proportion may be taken, depending on the quantity required.

The composition will be prepared and applied in the following manner, viz: Heat one gallon of coal-tar (or multiple thereof and of the following ingredients) until almost at the boiling-point, stirring it slowly and constantly. Then add about two ounces of slaked lime and stir until well mixed. Then successively add about one-half ounce of sal-soda and one-fourth ounce of gum-acacia, stirring each in well before adding the other. After adding the gum-acacia and stirring in well let the mixture boil gently for twenty minutes. Then add one-fourth ounce of oxid of zinc and after that five ounces of litharge, stirring each in well before adding another. Then increase the heat and boil hard for twenty minutes, at the end of which time add from six to eight ounces of finely-powdered gypsum. Through this composition, kept at a high boiling temperature, pass a material, such as paper or cloth, in such a manner as to submerge both sides of such material in said mixture, thereby saturating and coating the said material, rendering it waterproof and practically fireproof. The paper or cloth will dry out rapidly after passing through the composition, and when dry it is ready for use.

Having thus fully described my invention, what I claim as new, and wish to secure by Letters Patent, is—

1. The herein-described composition of matter, consisting of coal-tar, lime, sal-soda, gum-acacia, oxid of zinc, litharge, and gypsum, substantially as described and for the purposes specified.

2. The herein-described composition of matter for preparing building material, consisting of coal-tar one gallon, slaked lime two ounces, sal-soda one-half ounce, gum-acacia one-fourth ounce, oxid of zinc one-fourth ounce, litharge five ounces and gypsum six to eight ounces, substantially as described.

In witness whereof I have hereunto set my hand and seal, at Indianapolis, Indiana, this 12th day of October, A. D. 1901.

JAMES M. WRIGHT. [L. S.]

Witnesses:
JOSEPH A. MINTURN,
S. MAHLON UNGER.